US007584425B2

(12) United States Patent
Nader et al.

(10) Patent No.: US 7,584,425 B2
(45) Date of Patent: Sep. 1, 2009

(54) SYSTEMS AND METHODS FOR GENERATING REPORTS

(75) Inventors: Timothy C. Nader, Colorado Springs, CO (US); James Carter, Aurora, CO (US); Michael Alonso, Colorado Springs, CO (US); Daniel Stroud, Colorado Springs, CO (US); Thomas H. Beeson, Manitou Springs, CO (US); William E. Brunsen, Colorado Springs, CO (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1465 days.

(21) Appl. No.: 10/210,711

(22) Filed: Jul. 30, 2002

(65) Prior Publication Data

US 2003/0040936 A1 Feb. 27, 2003

Related U.S. Application Data

(60) Provisional application No. 60/308,600, filed on Jul. 31, 2001.

(51) Int. Cl.
*G06F 17/00* (2006.01)

(52) U.S. Cl. .................................................... 715/255

(58) Field of Classification Search ................ 715/500, 715/530, 200, 255
See application file for complete search history.

(56) References Cited

U.S. PATENT DOCUMENTS

| 5,396,342 | A | * | 3/1995 | Meyer | 358/406 |
|---|---|---|---|---|---|
| 5,671,351 | A | * | 9/1997 | Wild et al. | 714/38 |
| 5,692,169 | A | * | 11/1997 | Kathail et al. | 712/244 |
| 5,867,558 | A | * | 2/1999 | Swanson | 379/9.03 |
| 5,892,909 | A | * | 4/1999 | Grasso et al. | 709/201 |
| 5,923,740 | A | * | 7/1999 | Ito et al. | 379/114.01 |
| 6,006,269 | A | * | 12/1999 | Phaal | 709/227 |
| 6,018,713 | A | * | 1/2000 | Coli et al. | 705/2 |
| 6,269,396 | B1 | | 7/2001 | Shah et al. | |
| 6,377,567 | B1 | * | 4/2002 | Leonard | 370/352 |
| 6,397,131 | B1 | | 5/2002 | Busch et al. | |
| 6,401,118 | B1 | | 6/2002 | Thomas | |
| 6,434,546 | B1 | | 8/2002 | Williamowski et al. | |
| 6,442,714 | B1 | * | 8/2002 | Griffin et al. | 714/46 |
| 6,625,437 | B1 | * | 9/2003 | Jampolsky et al. | 455/405 |
| 6,745,140 | B2 | * | 6/2004 | Sutton | 702/67 |
| 7,028,221 | B2 | * | 4/2006 | Holland et al. | 714/31 |
| 7,085,360 | B1 | * | 8/2006 | Sprouse | 379/114.04 |
| 7,197,696 | B1 | * | 3/2007 | Muzumdar | 715/209 |
| 7,305,411 | B2 | * | 12/2007 | Sheridan | 707/102 |
| 2001/0054044 | A1 | * | 12/2001 | Liu et al. | 707/104.1 |
| 2002/0042784 | A1 | * | 4/2002 | Kerven et al. | 706/12 |
| 2002/0052962 | A1 | * | 5/2002 | Cherkasova et al. | 709/229 |
| 2002/0082985 | A1 | * | 6/2002 | MacKay | 705/39 |

(Continued)

OTHER PUBLICATIONS

Kerpedjiev, Automatic Generation of Multimodal Weather Reports from Datasets, ACM Mar. 1992, pp. 48-55.*

(Continued)

*Primary Examiner*—Cong-Lac Huynh

(57) ABSTRACT

A system for generating reports includes a graphical user interface that enables a user to submit requests for pre-defined or customized reports. The user may select the data upon which a report will be based and test the report at various stages to determine whether the report will provide the desired information.

26 Claims, 16 Drawing Sheets

U.S. PATENT DOCUMENTS

| | | |
|---|---|---|
| 2002/0113792 A1* | 8/2002 | Pena-Nieves et al. ....... 345/440 |
| 2002/0116301 A1* | 8/2002 | Chapman et al. .............. 705/29 |
| 2002/0136374 A1* | 9/2002 | Fleischer et al. ....... 379/114.01 |
| 2002/0147804 A1* | 10/2002 | Cosmao et al. ............. 709/223 |
| 2002/0169739 A1* | 11/2002 | Carr et al. ..................... 706/60 |
| 2002/0184133 A1* | 12/2002 | Zangari et al. ................ 705/36 |
| 2003/0004929 A1* | 1/2003 | Julian et al. ..................... 707/2 |
| 2003/0123628 A1* | 7/2003 | Rhodes ................. 379/114.01 |
| 2003/0144930 A1* | 7/2003 | Kulkarni et al. ............... 705/31 |
| 2003/0190912 A1* | 10/2003 | Jampolsky et al. .......... 455/423 |
| 2003/0202638 A1* | 10/2003 | Eringis et al. ............ 379/15.01 |
| 2003/0217289 A1* | 11/2003 | Ammon et al. ............. 713/201 |
| 2004/0015908 A1* | 1/2004 | Giel et al. ................... 717/141 |
| 2004/0024763 A1* | 2/2004 | Anderson ...................... 707/9 |
| 2004/0044665 A1* | 3/2004 | Nwabueze ..................... 707/9 |
| 2004/0088076 A1* | 5/2004 | Gardner, Jr. ................ 700/239 |
| 2004/0158536 A1* | 8/2004 | Kowal et al. ................ 705/400 |
| 2004/0199413 A1* | 10/2004 | Hauser et al. .................. 705/7 |
| 2004/0203721 A1* | 10/2004 | Grooms ...................... 455/423 |
| 2005/0131798 A1* | 6/2005 | Eisler et al. ................... 705/37 |
| 2005/0216421 A1* | 9/2005 | Barry et al. ................... 705/64 |
| 2005/0278657 A1* | 12/2005 | Davidson et al. ............ 715/963 |
| 2006/0265323 A1* | 11/2006 | Winter et al. ................. 705/37 |

OTHER PUBLICATIONS

Fritzsche et al., Formalization and Proof of Design Guidelines within the Scope of Testing Formally Specified Electronic Product Catalogues, Google 2000, pp. 209-223.*

Kuzmak et al., "Computer-aided Generation of Result Text for Clinical Laboratory Test", IEEE, Oct. 1983, pp. 275-278.

Marwedel, "Tree-based Mapping of Algorithms to Predefined Structures, IEEE", Nov. 1993, pp. 586-593.

* cited by examiner

*AlphaNumeric Translations Utility*

| Field | Value | Translation |
|---|---|---|
| Card | 0343663452 | Adher, Michael |
| Card | 2273426578 | Baily, Pam |
| Card | 7644435677 | Bullurd, Claire |
| Card | 0343663345 | Benson, Tom |

All Fields:
- Access
- Bill_ID
- Card
- Catalog_ID
- Cust_Det_Fld
- Dialed_No
- IDACC
- Node
- NonCCID
- Orig_City
- Orig_Cry
- Orig_Intl_Ind
- Orig_No
- Orig_State
- Prod_Code
- Prod_ID
- switch_trunk
- Term_City
- Term_Cry
- Term_Ctry_Code
- Term_Intl_Ind
- Term_No
- Term_State 1000, 1010, 1020

SYSTEMS AND METHODS FOR GENERATING REPORTS

RELATED APPLICATION

This application claims priority under 35 U.S.C. § 119 based on U.S. Provisional Application Ser. No. 60/308,600, filed Jul. 31, 2001, the disclosure of which is incorporated herein by reference.

FIELD OF THE INVENTION

The present invention relates generally to reports and, more particularly, to systems and methods for generating reports for analysis and review.

BACKGROUND OF THE INVENTION

Companies today have become increasingly reliant upon telephone systems and telecommunications services. For example, many companies now use a number of telecommunications products, such as cellular services, calling cards, toll free services, in addition to their conventional telephone services.

As a result, the amount of money that a typical company spends on telecommunications has increased. Correspondingly, the amount of data associated with a company's telecommunications services and bills has significantly increased.

Conventional systems used to analyze telecommunications usage are typically configured to allow the user to view pre-defined information regarding their usage. Such systems, however, are typically not flexible in allowing customers to customize various reports to assist them in reviewing their usage data. Since reviewing and analyzing their usage data may be cumbersome, this may result in delays by customers in approving their bills for payment. In addition, providing pre-defined information may not provide customers with insight into their overall telecommunications usage.

SUMMARY OF THE INVENTION

There exists a need for systems and methods that allow customers to generate reports based on their own particular requirements.

These and other needs are met by the present invention, where a server that is accessible to a number of client devices stores usage data with respect to a customer's account. The server executes a report program that provides a user interface to the client devices. The user interface allows a user to create a customized report request and submit the request to the server. The report program may then generate the desired report and transmit the report to the client.

According to one aspect of the invention, a method for generating a report regarding a user's telecommunications usage is provided in a system that includes at least one server and at least one client device. The method includes providing a user interface for the client device, the user interface allowing the user to generate a report request associated with the user's telecommunications usage and to test the report. The method also includes inputting, by the user, information identifying a plurality of fields associated with at least one telecommunications product and at least one set of data upon which the report will be based and inputting a test command. The method further includes receiving the information identifying the plurality of fields, the at least one set of data and the test command, generating a report based on the received information and downloading the report to the client device.

Another aspect of the present invention provides a computer-readable medium that includes stored sequences of instructions that are executed by a processor. The instructions cause the processor to provide a graphical user interface (GUI) to a client device. The GUI allows a user to generate a request for a customized report associated with the user's telecommunications usage and to select at least one set of data upon which the customized report will be based. The instructions also cause the processor to generate the customized report based on information received via the GUI, where the information identifies various fields and conditions associated with the customized report. The instructions further cause the processor to provide the customized report to the client device.

A further aspect of the present invention provides a system for generating reports. The system includes a memory and a processor. The memory is configured to store data associated with a customer's telecommunications usage. The processor is configured to provide a GUI that allows the customer to generate a request for a customized report and to select data upon which the customized report will be based. The processor is also configured to receive information identifying various fields and conditions associated with the customized report and information identifying at least one set of data upon which the customized report will be based, where the data is stored in the memory. The instructions further cause the processor to generate the customized report based on the received information and the at least one set of data and provide the customized report.

Other features and advantages of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation represent like elements throughout.

FIG. 9 illustrates an exemplary query screen, consistent with the present invention, that may be downloaded to the client.

FIG. 10 illustrates an exemplary alphanumeric translation utility screen consistent with the present invention.

FIG. 14 illustrates an exemplary batch status screen consistent with the present invention.

FIG. 15 illustrates an exemplary deferred batches screen consistent with the present invention.

DETAILED DESCRIPTION

Systems and methods consistent with the present invention provide users with the ability to generate reports based on their own particular requirements. Users input specific report requests relating to their accounts to a server. The server generates the desired reports and forwards the reports to the user in the desired format. This enables the user to easily review and analyze their telecommunications usage.

System Overview

Figure 1:
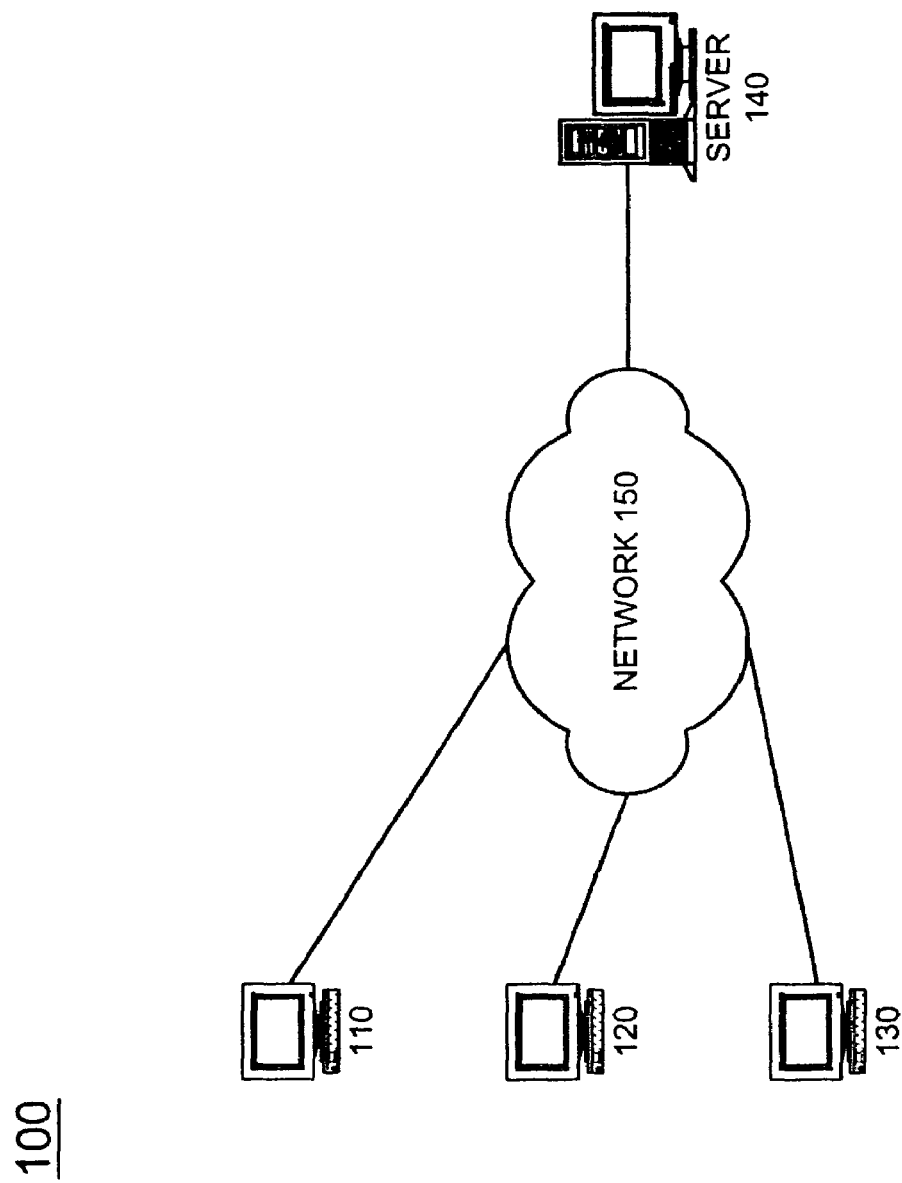
FIG. 1 is a block diagram of an exemplary system in which methods and systems consistent with the present invention may be implemented.

FIG. 1 is a block diagram of an exemplary system 100 in which methods and systems consistent with the present invention may be implemented. The system 100 includes a plurality of clients 110, 120 and 130, server 140 and network 150.

The clients 110, 120 and 130 may each include any type of computer system, such as a personal computer, a laptop or a personal digital assistant (PDA), with a connection to network 150. Alternatively, clients 110, 120 and 130 may represent dumb terminals that may communicate with server 140. The clients 110, 120 and 130, consistent with the present invention, represent users having access to data stored in server 140. The clients 110, 120 and 130 may establish communications with server 140 over network 150 via wired, wireless, or optical connections. The network 150 may include the Internet, a local area network (LAN), a wide area network (WAN), an intranet or another type of network. In alternative implementations, clients 110, 120 and 130 may connect directly to server 140.

The server 140 may include any type of computer system, such as a mainframe, minicomputer or personal computer, which includes a connection to network 150 to enable server 140 to communicate with clients 110, 120 and 130. In alternative implementations, the server 140 may include a mechanism for directly connecting to clients 110, 120 and 130. The server 140 may also include a mechanism for communicating with an optional message server/import server (not shown) that stores telecommunications call data and performs message processing. Having a separate message server/import server may enable server 140 to devote more processing time to report generation. The server 140 may transmit data over network 150 via wired, wireless or optical connections.

The server 140, consistent with the present invention, includes a report program that enables clients 110-130 to access usage data and receive reports associated with their telecommunications usage. The particular reports may be pre-defined reports or customized reports, as described in more detail below.

Only three clients 110, 120 and 130 and a single server 140 are shown for simplicity. It should be understood, however, that additional clients and servers may be included in system 100.

Exemplary Server

Figure 2:
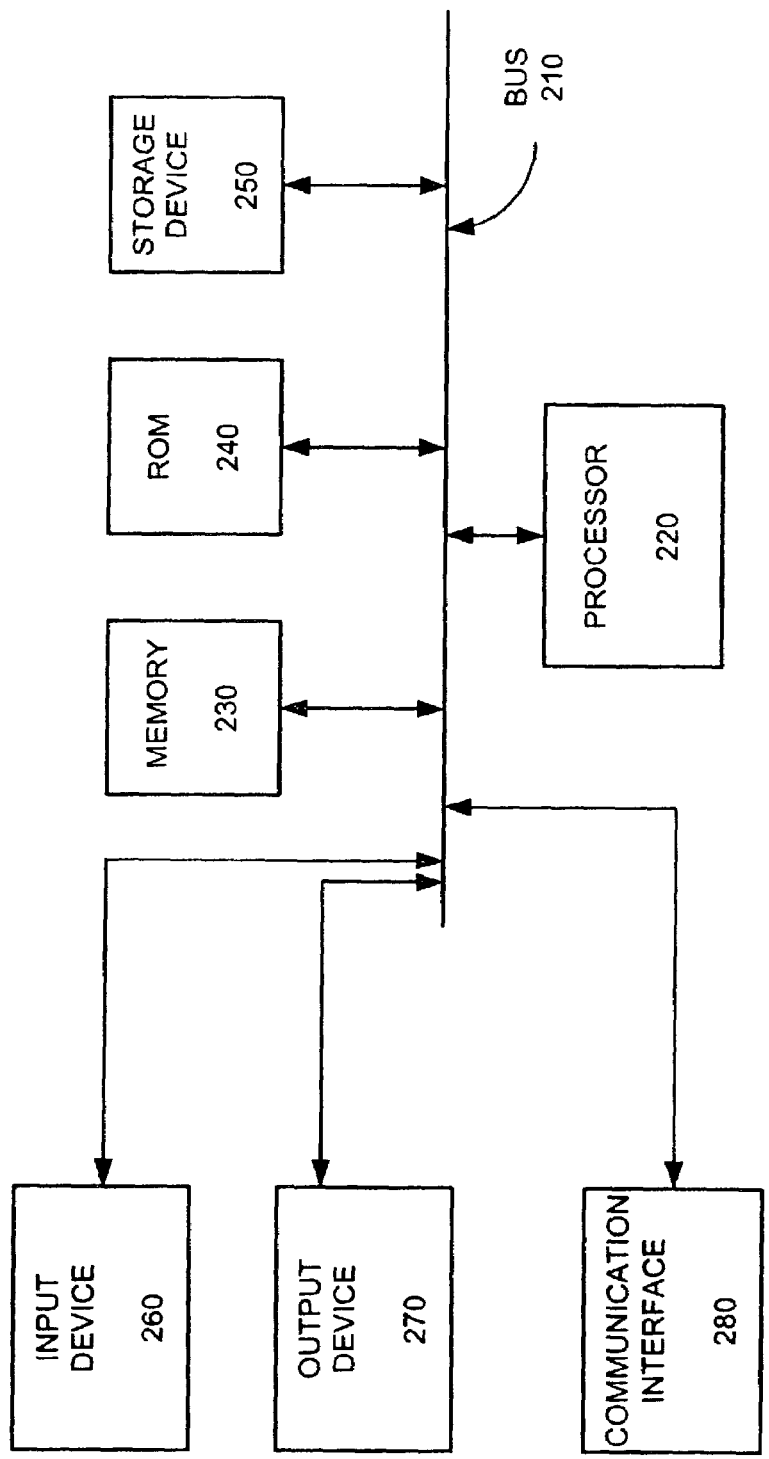
FIG. 2 is a block diagram of an exemplary server illustrated in FIG. 1, consistent with the present invention.

FIG. 2 is an exemplary diagram of server 140 of FIG. 1. The server 140 includes a bus 210, a processor 220, a memory 230, a read only memory (ROM) 240, a storage device 250, an input device 260, an output device 270, and a communication interface 280. The bus 210 permits communication among the components of the server 140.

The processor 220 may include any type of conventional processor or microprocessor that interprets and executes instructions. The memory 230 may include a random access memory (RAM) or another dynamic storage device that stores information and instructions for execution by the processor 220. Memory 230 may also be used to store temporary variables or other intermediate information during execution of instructions by processor 220.

ROM 240 may include a conventional ROM device and/or another static storage device that stores static information and instructions for processor 220. The storage device 250 may include a magnetic disk or optical disk and its corresponding drive and/or some other type of magnetic or optical recording medium and its corresponding drive for storing information and instructions.

The input device 260 may include any conventional mechanism that permits an operator to input information to the server 140, such as a keyboard, a mouse, a pen, voice recognition and/or biometric mechanisms, etc. The output device 270 may include any conventional mechanism that outputs information to the operator, including a display, a printer, one or more speakers, etc. The communication interface 280 may include any transceiver-like mechanism that enables the server 140 to communicate with other devices and/or systems, such as the clients 110-130. For example, the communication interface 280 may include a modem or an Ethernet interface to a LAN. Alternatively, communication interface 280 may include other mechanisms for communicating via a network, such as network 150.

The server 140, consistent with the present invention, executes a report program that provides a forum through which customers can request reports associated with their telecommunications usage. According to one implementation, the server 140 generates reports in response to processor 220 executing sequences of instructions contained in memory 230. Such instructions may be read into memory 230 from another computer-readable medium, such as a data storage device 250, or from a separate device via communication interface 280. It should be understood that a computer-readable medium may include one or more memory devices or carrier waves. Execution of the sequences of instructions contained in memory 230 causes processor 220 to perform the process steps that will be described hereafter. In alternative embodiments, hard-wired circuitry may be used in place of or in combination with software instructions to implement the present invention. Thus, the present invention is not limited to any specific combination of hardware circuitry and software.

Exemplary Processing for Requesting and Generating Reports

Processing consistent with the present invention enables a user (e.g., a customer), via a client device, to submit report requests to server 140. Server 140 then generates the desired report and downloads the data to the customer in the desired format.

Figure 3:
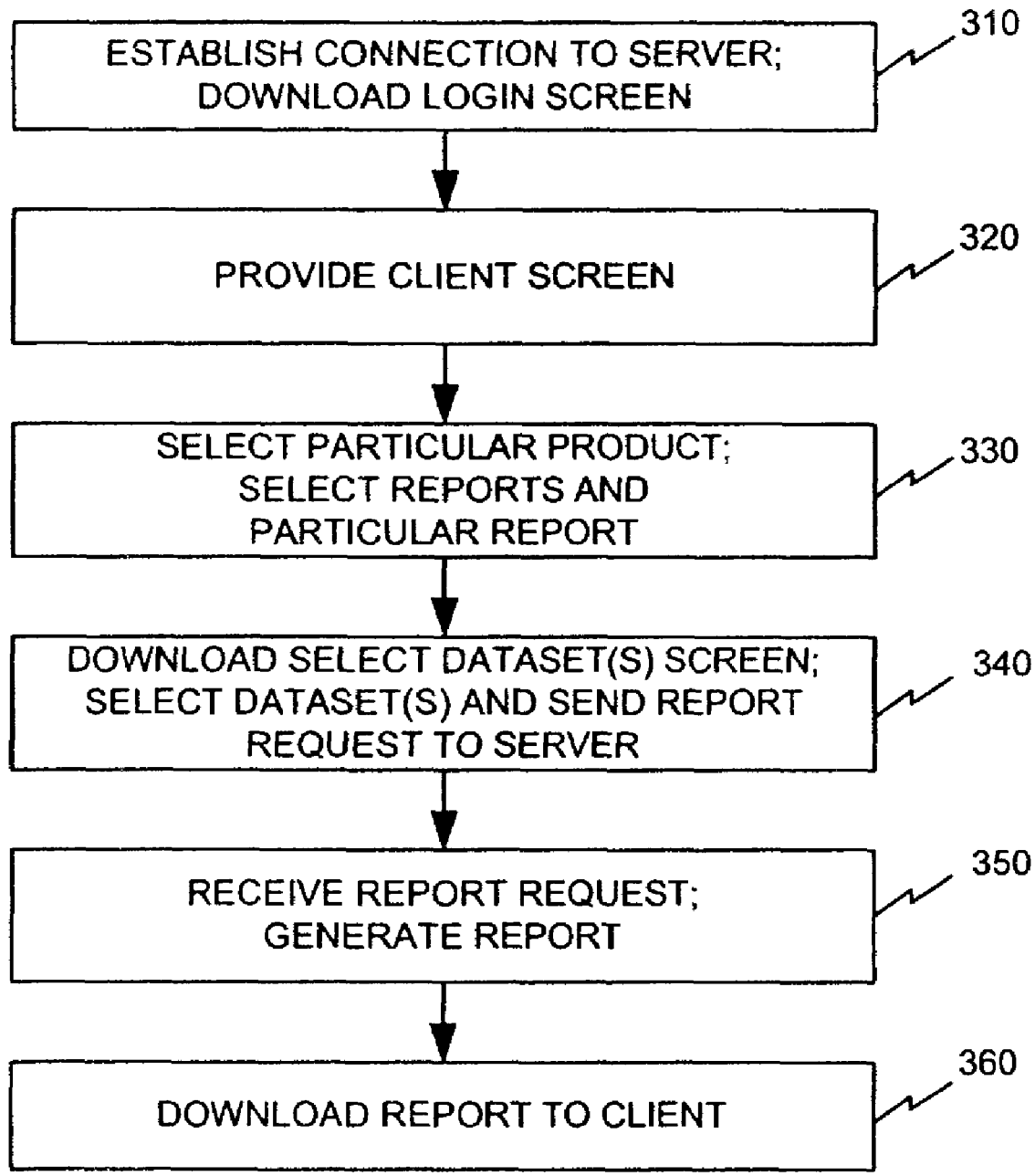
FIG. 3 is an exemplary flow diagram, consistent with the present invention, illustrating processing associated with requesting and generating reports.

FIG. 3 is an exemplary flow diagram, consistent with the present invention, illustrating processing associated with requesting and generating reports. Processing may begin when a user establishes a connection to the server 140 via a client device, such as client 110 (act 310). The user may accomplish this via any conventional connection. For example, client 110 may establish a connection with server 140 using a browser application located on client 110. After connection to the server 140 is established, client 110 may receive a login screen prompting the user to enter a user name and password (act 310). The user enters a user name and password and transmits the information to the server 140. If the user is authorized to access the report program, the server 140 downloads a client screen to client 110 (act 320). Alternatively, the client screens associated with requesting a report, described in more detail below, may be resident on client 110. In this case, client 110 provides the client screen to the user (act 320).

Figure 4:
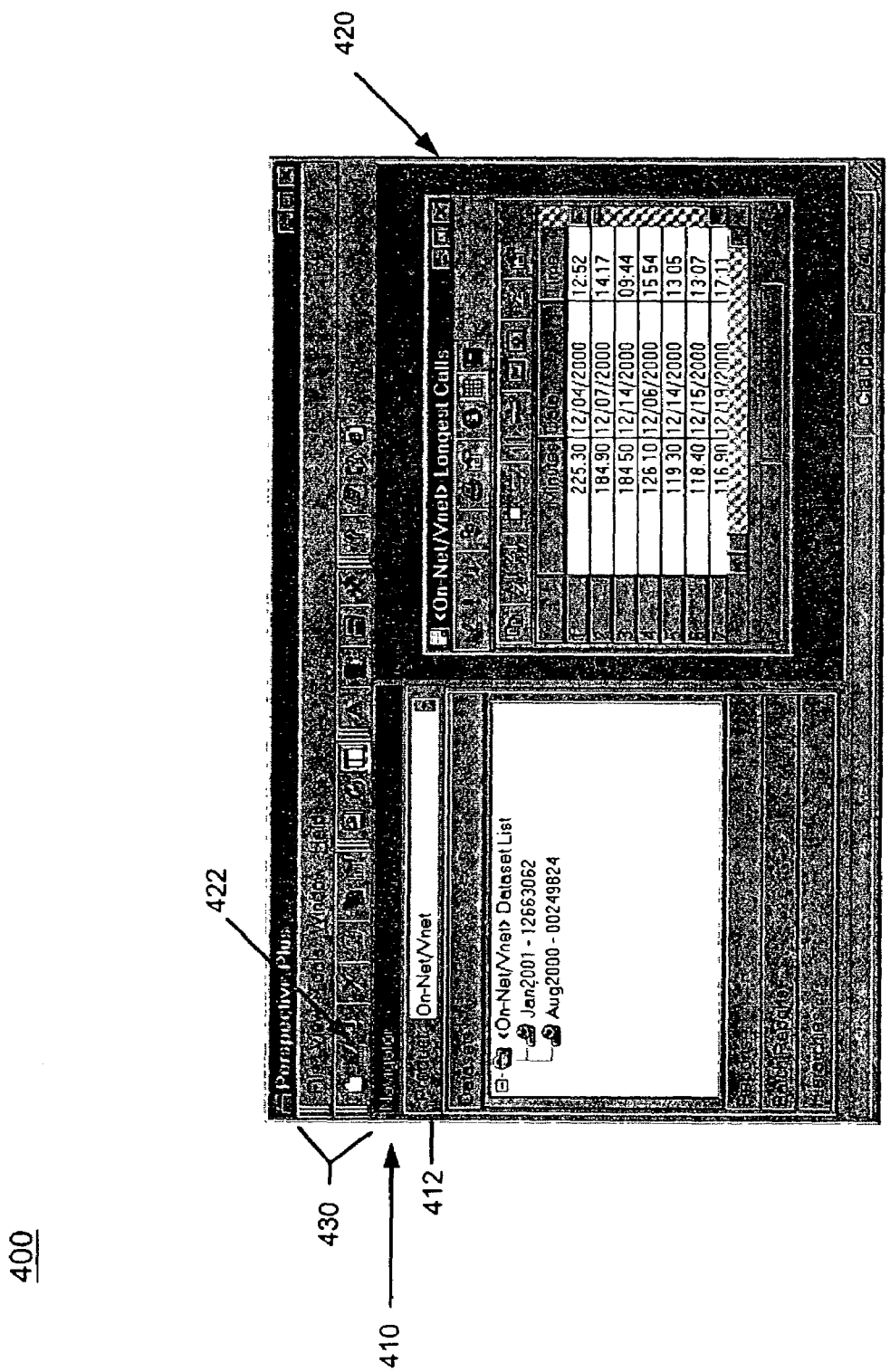
FIG. 4 is an exemplary client screen consistent with the present invention.

FIG. 4 illustrates an exemplary client screen 400 consistent with the present invention that may be provided to a user. Screen 400 includes navigator window 410, report window 420 and menu/tool bar 430. The navigator window 410, consistent with the present invention, displays the particular product currently in use at area 412 and four title bars, labeled Datasets, Reports, Batch Reports and Hierarchies. In the exemplary screen 400, the product currently in use is associated with a customer's internal telephone network (e.g., the Vnet product). Other products, such as products associated with a customer's long distance service, toll free service, cellular service, calling card service, Internet service, voice over Internet Protocol (VoIP) service or any other telecommunications service to which the user's company subscribes, may also be available and may be accessed via the drop down menu at area 412.

In addition, the user may click on the title bar associated with a particular list (i.e., datasets, reports, batch reports, hierarchies) to view the items associated with that list. In screen 400, the datasets list is displayed, which includes two sets of data, one for January 2001 and one for August 2000.

The January 2001 and August 2000 data may be loaded onto server 140 by an administrator responsible for the report program. For example, the data may be stored on storage device 250. Alternatively, the data may be stored on an external storage device accessible to server 140. In an exemplary implementation, each customer/company may receive its own monthly usage data stored on compact disk (CD) or some other conventional recording medium. Alternatively, the customer's monthly data may be sent to the customer electronically via the Internet. In either case, the usage data may be stored on server 140 for access by the report program. The report program executed by server 140 includes a data importer graphical user interface (GUI) that guides the customer in loading the data. After the server 140 finishes loading a new month's data, a new dataset may be listed when the datasets are displayed in the navigator window 410 of client 110. The user may then select the new dataset to create reports, as described in more detail below. Having datasets for more than one month available on server 140 facilitates running quarterly reports, yearly reports, month-to-month comparisons, etc. In addition, each dataset, consistent with the present invention, may be associated with one product. The user can view datasets for different products by choosing a product and clicking on the datasets title bar. The datasets list will then display only the datasets for that product.

The report window 420 displays the actual reports. In the exemplary report window 420 illustrated in FIG. 4, a single report for longest calls is displayed. This report may be considered a detailed report. Other detailed reports may include, for example, report for most expensive calls, off-peak calls, calls to a particular area code, etc. Summary reports and summary reports with detail may also be available. Examples of summary reports may include: frequent calls summary, 800 number summary, audio conference summary, cellular summary, long distance summary, etc. It should be understood that the number of available reports and particular type of reports are dependent upon the particular product. Implementations of the present invention also permit a user to customize reports, as described in more detail below.

Assume that the user wishes to run a report on the toll free product/service. The user may use the drop-down menu at product area 412 and select "toll free" (act 330). The user may then select "reports" on navigator window 410 (act 330). The navigator window 410 may then display folders labeled Detail Reports, Summary Reports and Summary with Detail Reports, as illustrated in screen 500 in FIG. 5. The user may then expand on the detail reports folder and the available detail reports are displayed, as illustrated in screen 500. In the exemplary screen 500, the available detail reports are longest calls and most expensive calls. Assume that the user wishes to run a report on the longest calls. The user selects "longest calls" by, for example, double clicking on the particular report or via some other mechanism typically employed with GUIs, such as highlighting the report and selecting "enter" (act 330).

Figure 5:
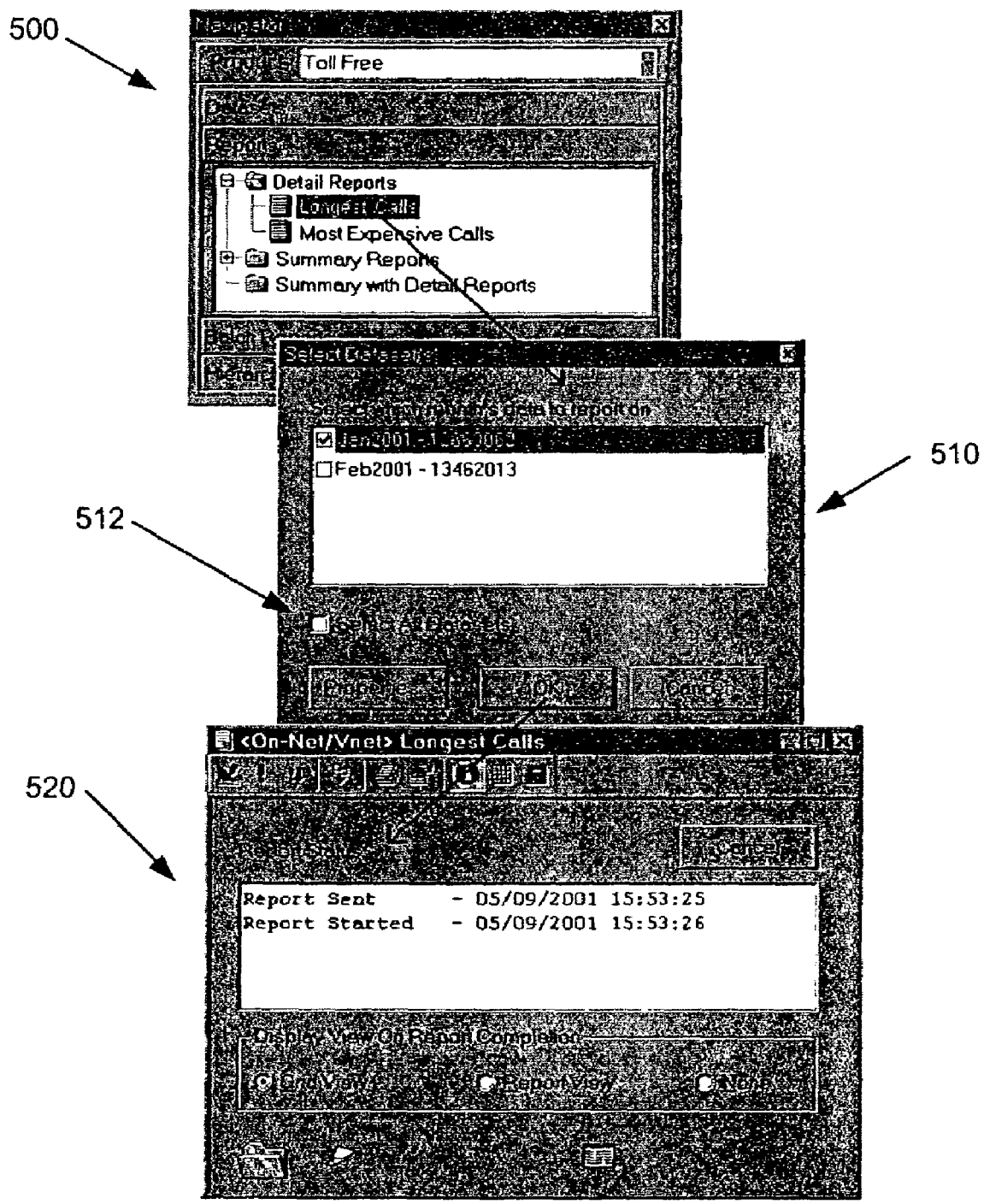
FIG. 5 illustrates exemplary interface screens, consistent with the present invention, for running reports.

In any event, after selecting the particular report, the server 140 downloads a select dataset(s) window 510, as illustrated in FIG. 5 (act 340). Alternatively, the select dataset(s) window 510 may be resident on client 110 and may be provided to the user directly from client 110. In either case, the exemplary select dataset(s) window 510 displays two sets of available data, one for January 2001 and one for February 2001. Assume that the user wishes to run a report using the January 2001 data. The user selects the January 2001 data, as indicated by the check mark next to that set of data. In implementations consistent with the present invention, the user may select more than one dataset on which to run the report. For example, the user may select 12 months or more of data on which to run a report. Box 512, labeled "Select All Datasets," enables the user to quickly select all of the listed datasets.

After the user has selected the dataset(s), the user may click the OK button. The client 110 then sends the report request to server 140 (act 340). The client 110 may then display a report status screen that shows the status of the report (e.g., sent, started, etc.), such as screen 520 illustrated in FIG. 5.

The server 140 receives the report request and generates the desired report (act 350). When the server 140 completes the report, the server 140 downloads the results to client 110 in the desired format (act 360). For example, server 140 may download the report for display in window 420 or for output to a printer, save the report to a file, etc., as described in more detail below.

Figure 6:
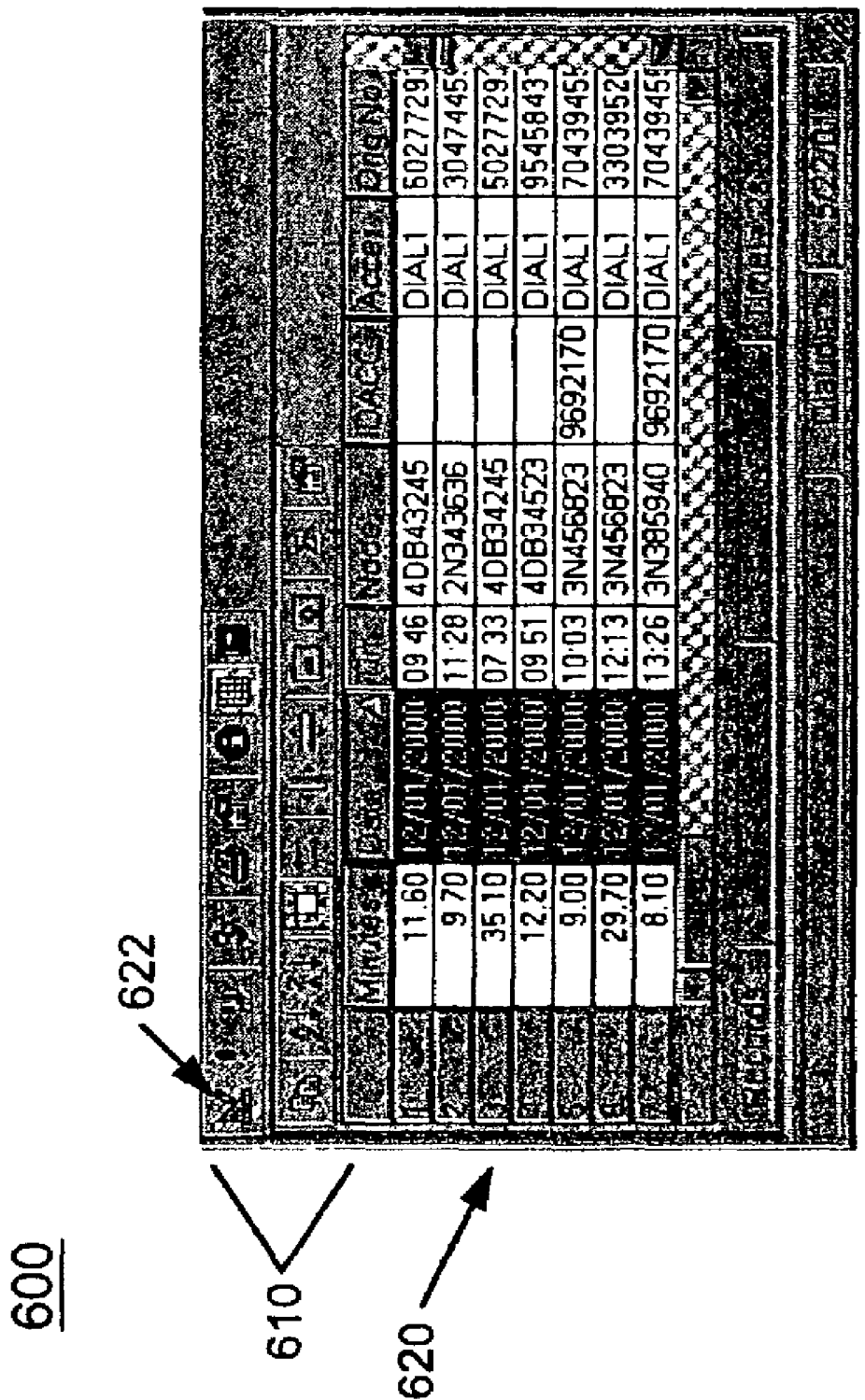
FIG. 6 is an exemplary report screen, consistent with the present invention, which may be downloaded to a client device for display.

FIG. 6 illustrates an exemplary GUI 600 downloaded to client 110 by which reports may be displayed in an implementation consistent with the present invention. The GUI 600 provides a report showing the longest toll free calls for the user's company over the period associated with the selected dataset(s). The GUI 600 includes a tool bar 610 and the actual report 620 displayed in "grid view."

The grid view illustrated in FIG. 6 presents report information in a spreadsheet-like manner. In this format, column widths may be adjusted by clicking and dragging the column separators in the header line of the report. The user may also select a column and re-sort the report according to the values in that column, using tool bar 610. The date column in screen 600 has been sorted in ascending order, as indicated by the triangle located next to the date label pointing upwards.

The user may also select rows, columns and individual groups of cells and select "copy" to copy the associated data to a clipboard. This data may then be pasted directly into analysis, presentation or documentation applications.

Other capabilities available from the tool bar 610 may include: sort ascending (sorts results by the selected column in ascending order), sort descending (sorts results by the selected column in descending order), auto size columns (automatically resize each column), move column (moves a column to the left or right of its current position), vertical splitter (splits the grid into two parts vertically), horizontal splitter (splits the grid into two parts horizontally), hide column (hides a column so it is not visible in the grid), unhide all columns (unhides all columns previously hidden), sum (displays the sum and average value of all the selected cells) and grid properties (changes the grid display properties). These features enable the user to customize the layout of the report, thereby facilitating use of the report for the user's particular purposes.

Reports may also be generated in "report view." In report view, the server 140 outputs the report in an invoice-like style. For example, the report may not include the grid lines shown in FIG. 6.

Reports, consistent with the present invention, may also allow the user to "drill down" or expand on data items included in a report. For example, assume that the user requested a summary report and one of the summary lines indicates that the user made 52 long distance calls, which lasted a total of 700 minutes for a total cost of $25. The user may select that record (e.g., by clicking on the summary line) and the details associated with that summary line are displayed. In other words, the user would be able to view data associated with each of the 52 calls.

Reports, consistent with the present invention, may similarly allow the user to expand on data items in detailed reports to view further records associated with the particular detail. In this manner, the user can drill down on data provided in the report to gain additional data on that item, without having to transmit additional requests to server 140. Implementations consistent with the present invention may provide a plus sign (+) to indicate that a particular record may be expanded to display additional information.

Processing for Creating a Custom Report

The report program, as described above, provides for the generation of various predefined or standard reports associated with a user's telecommunications usage. The report program, consistent with the present invention, also permits the user to define and generate custom reports. Custom reports, consistent with the present invention, may be implemented by copying a standard report, modifying the standard report and saving the modified report with a new name. Alternatively, custom reports may be built from scratch.

Custom reports, consistent with the present invention, may be run as soon as they are created or at any later time. In addition, custom reports may have full access to the data and formatting available for standard reports. This allows a user to create reports to a desired level of sophistication, as described in more detail below.

In an exemplary implementation consistent with the present invention, the reporting program includes a report designer that facilitates creation of the desired custom report(s). The report designer also allows the user to test the report to see if the report provides the desired data, as described in more detail below.

Figure 7:
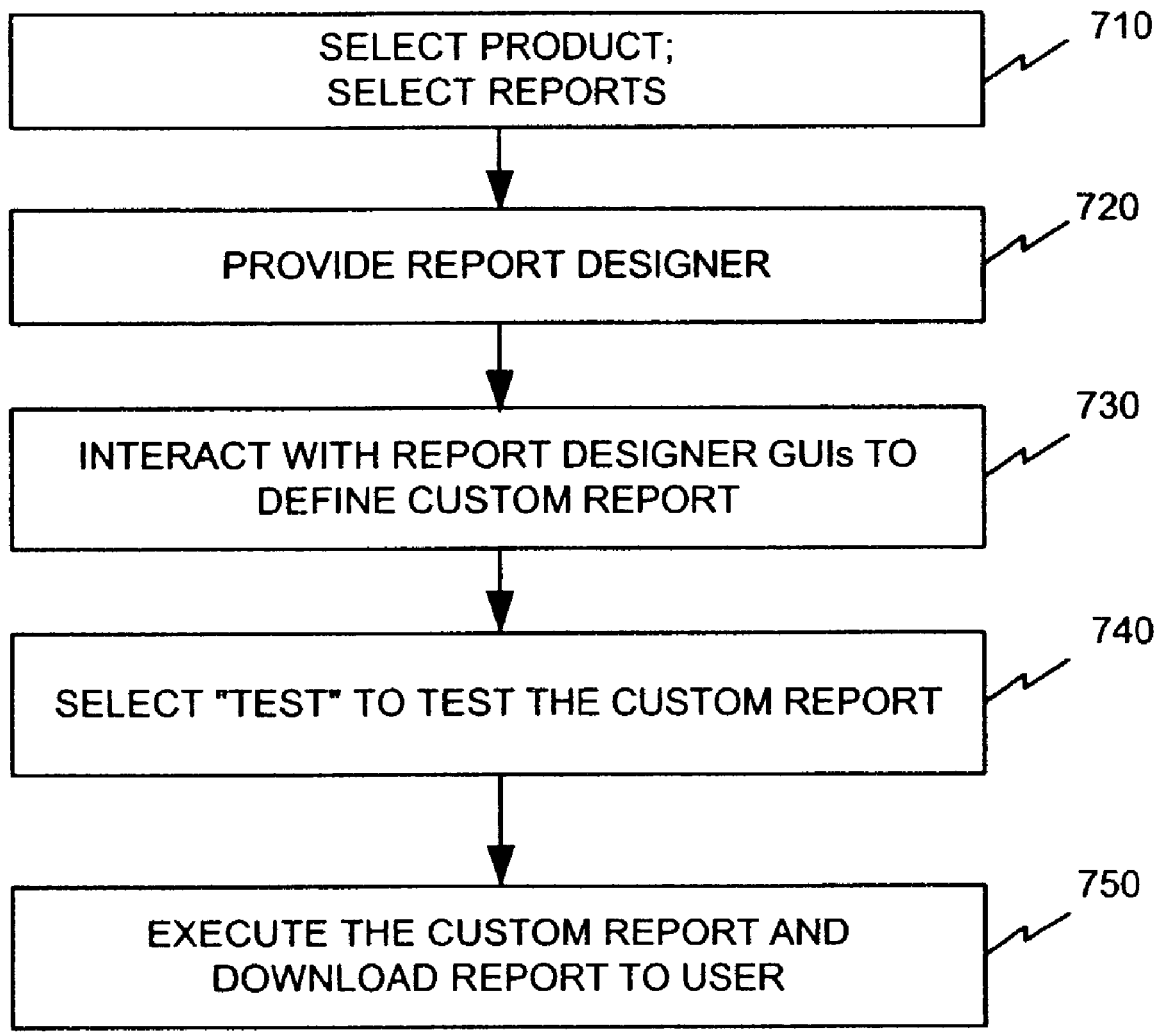
FIG. 7 is an exemplary flow diagram, consistent with the present invention, illustrating processing for creating and executing a custom report.

FIG. 7 is an exemplary flow diagram, consistent with the present invention, illustrating processing for creating and running a custom report. The reports, as described above, may be based on the particular telecommunications products to which a user subscribes. Therefore, the user first selects the particular product for which he/she wishes to create a custom report (act 710). For example, the user selects the particular product in the navigator window 410 at area 412 (FIG. 4). The user may then select the reports title bar in the navigator window 410 (act 710). In an exemplary implementation, the user may then select design icon 422 (FIG. 4; also illustrated as icon 622 in FIG. 6) or use the menu/tool bar 430 (FIG. 4) to select a "new" command found under the File menu to initiate the creation of a custom report. Alternatively, the user may select a particular report in navigator window 410 upon which to base a custom report, as described in more detail below.

Assume that the user wishes to create a new report that is not based on an existing report. In this case, the server 140 downloads a report designer that is not pre-loaded with an existing report (act 720). Alternatively, the report designer may be resident on client 110 and may be provided directly to the user from client 110. The report designer provides a series of GUIs to guide the user in creating the desired report. In an exemplary implementation, reports are created using six GUI screens described in detail below. The user interacts with the GUI screens to define what information the report will include (act 730). The report designer also allows the user to test the report, as described in detail below.

Figure 8A:
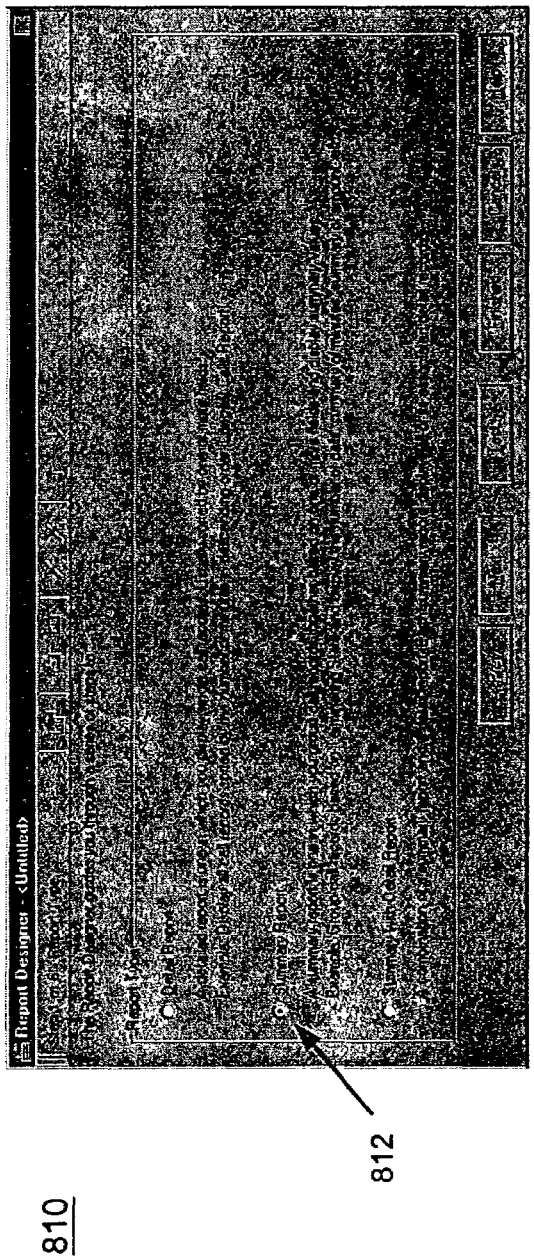
FIGS. 8A-8F illustrate exemplary interface screens, consistent with the present invention, for generating and running custom reports.

FIG. 8A illustrates an exemplary report type screen 810, consistent with the present invention, that may be provided act 720. Screen 810 prompts the user to select a particular report type, such as a detail report, summary report and summary with detail report. Detail reports may display the cost, length (minutes), terminating city, date upon which calls were made, and other information based on the particular report. Summary reports provide summations of groups of records. For example, an exemplary summary report may provide the total amount of calls made each day and the total cost of calls made during each respective day. A summary report with detail effectively combines the information from the detail report and the summary report.

Figure 8B:
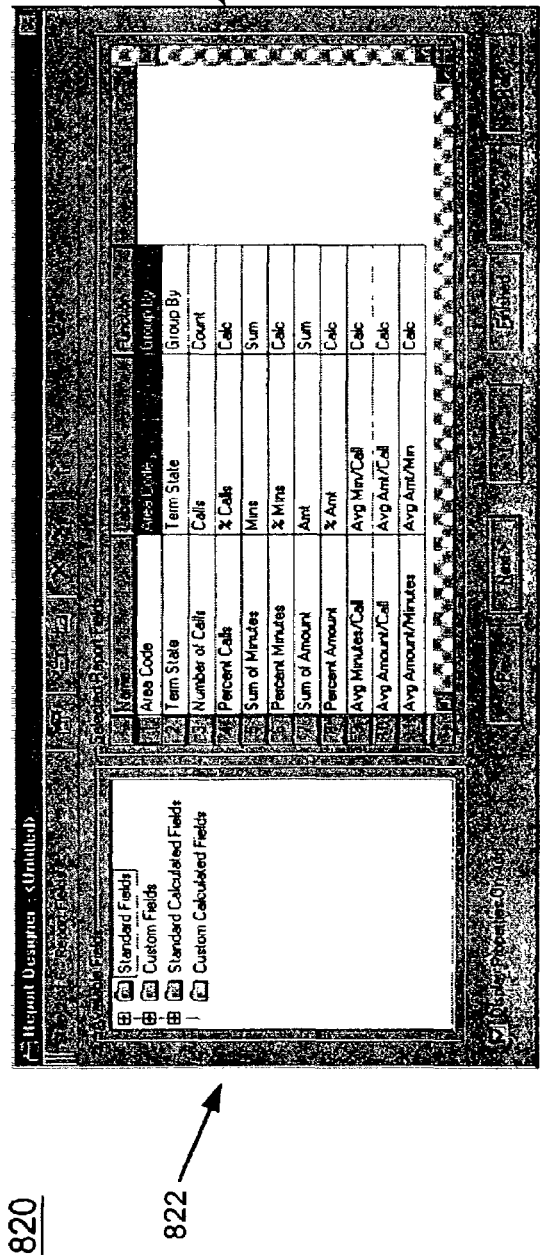

Assume that the user selects summary report, as indicated by selection 812 in FIG. 8A, and selects "next." The server 140 then provides client 110 with a report fields screen 820, as illustrated in FIG. 8B. Screen 820 includes an available fields window 822 and a selected report fields window 824. The available report fields window 822 includes a standard fields folder, a custom fields folder, a standard calculated fields folder and a custom calculated fields folder. These folders may be expanded to display the particular data fields associated with the given product.

For example, the standard field list may include data fields that make up the call records. Such fields may include the originating number, amount of the call, date on which the call was made, etc. Custom fields may include fields defined by the user. For example, the user may define a field to identify calls to a particular destination. Standard calculated fields may include fields that require calculations. For example, a standard calculated field may include "average amount per call" or "percentage of total minutes."

The report program, consistent with the present invention, also includes a formula builder that enables the user to define fields that include embedded formulas or equations. For example, the user may want a report that includes the sum of two fields, such as the sum of the amount field that includes the amount for a call(s) and the tax field that includes the tax associated with the call(s). Alternatively, a custom calculated field may include a "what if" field, such as "amount times 1.1." This would allow the user to see what effect a 10% increase would have on costs. The formula builder may also allow the user to define more complex formulas that include Boolean logic. For example, the user may define a field to include calls that are greater than X minutes in length and cost more than Y dollars.

Figure 8C:
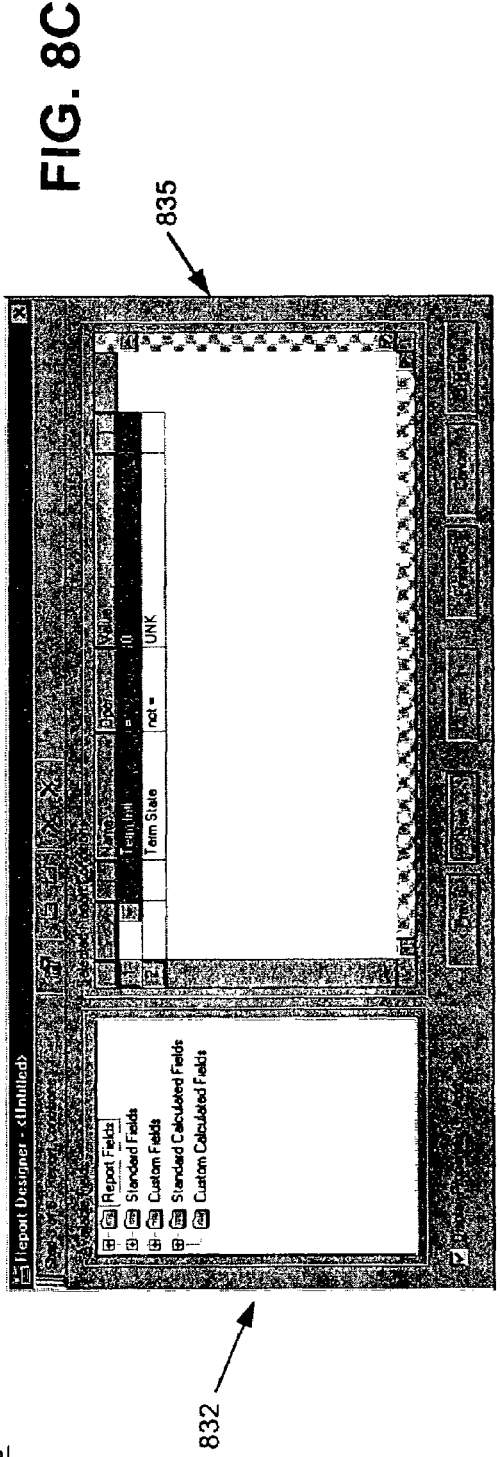

In summary, screen 820 allows the user to add only those fields he/she wishes to see in the report. In exemplary screen 820, selected report fields window 824 lists 11 fields that the user wishes to view in the summary report. After selecting these particular fields, the user can also change the order of the fields, modify their properties, delete one or more of the fields, etc. The user can also change labels associated with the fields using an alphanumeric translation utility to make the report easier to understand, as described in more detail below. After making the desired changes, if necessary, the user selects "next" and client 110 displays report conditions screen 830, illustrated in FIG. 8C.

Screen 830 includes available fields window 832 and selected report conditions window 835. Window 832 includes the same folders as available fields window 822 in FIG. 8B, along with a report fields folder. The report fields folder contains a list of the fields added via screen 820. Screen 830 allows the user to select a subset of the records to effectively restrict the report. For example, the user may only want to include calls that originated in a specific city or only those that terminated in a specific area code. In an exemplary implementation, the user can restrict the report by placing conditions on any field, even if the field is not included in the report. For example, the user can restrict the dates for which the report will be run, such as run the report only include data for a particular week.

In the exemplary screen 830, the selected report conditions window 835 includes a name field, an operand field and a value field. In the exemplary window 835, two report conditions are displayed: "Term Intl=0" and "Term State not=UNK." The first condition, Term Intl=0, may represent a call terminated in a particular country, where the value "0" represents the particular country. For example, "0" may represent the United States. The second condition "Term State not=UNK," may represent a call terminated in a particular state, where the state is identifiable, i.e., not unknown. These particular report conditions correspond to conditions that the user wishes to define for the report and may be entered via the use of drop down menus or manually via a keyboard.

Figure 8D:
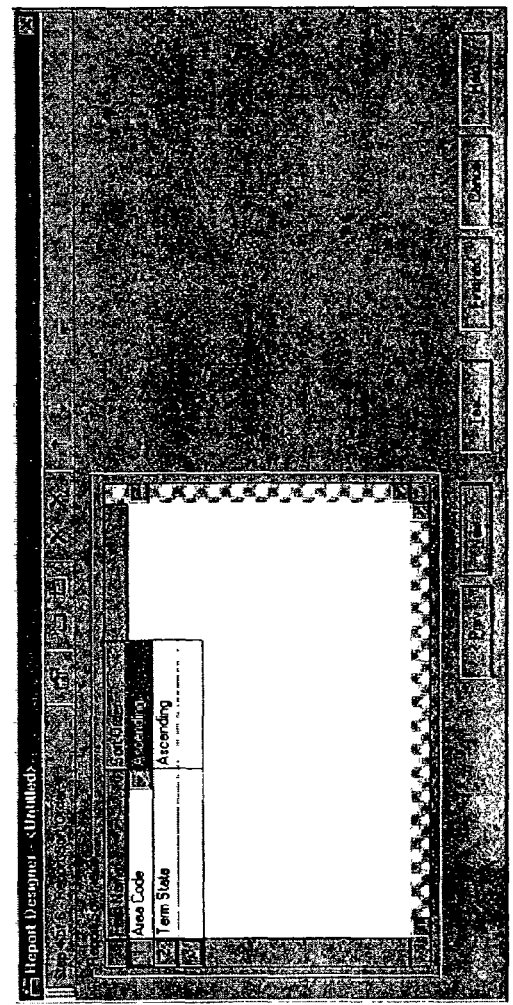

After entering the particular report conditions and selecting "next," the client 110 displays a report sort order screen 840, as illustrated in FIG. 8D. Screen 840 includes a field name field and a sort order field. Screen 840 allows the user to select the sort order that defines how the records in the report will be sorted. For example, the sort order "ascending" may sort with the lowest value at the top of the report. Conversely, the sort order "descending" may sort with the highest value at the top of the report. In exemplary screen 840, the area code field is listed as ascending. In this case, the area code with the lowest numerical value will be at the top of the report.

Figure 8E:
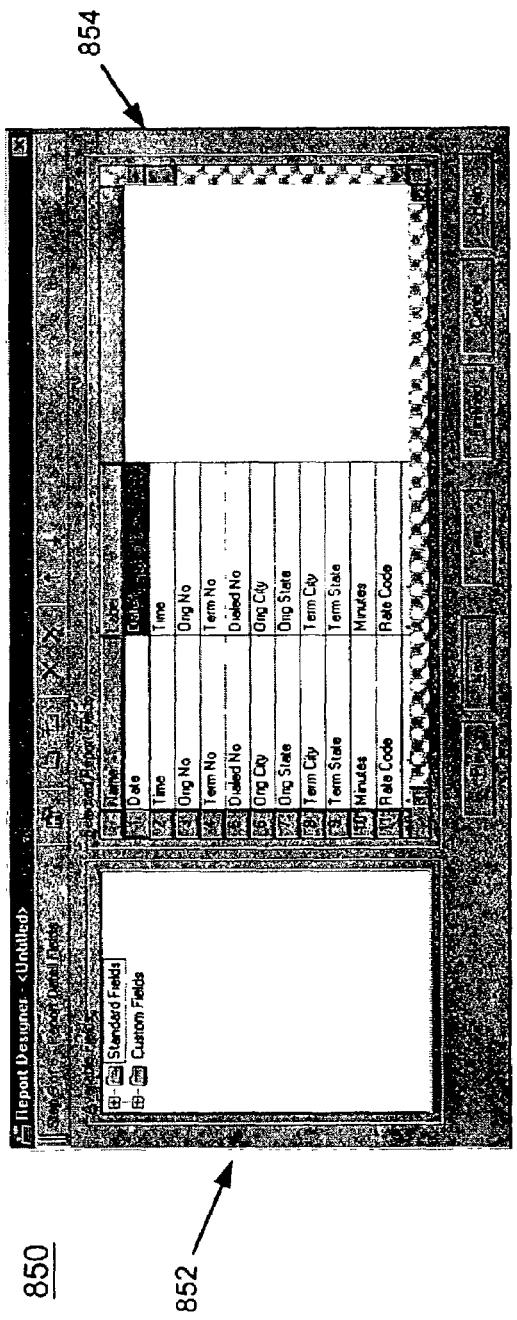
Figure 8F:
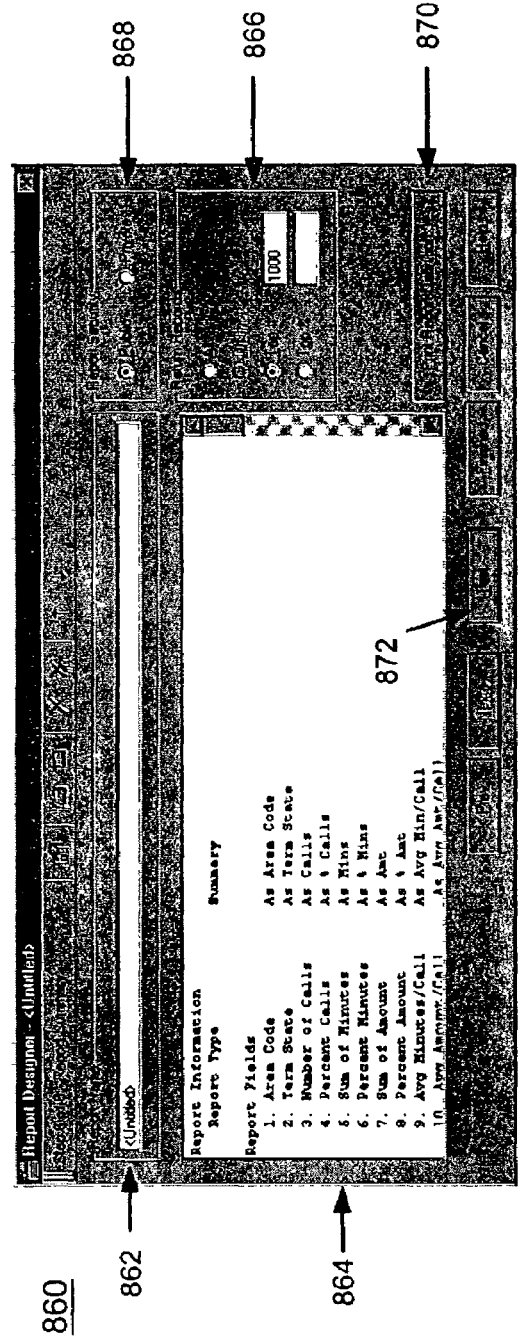

After selecting the sort order, the user may select "next" and the client 110 displays report detail fields screen 850, illustrated in FIG. 8E. Screen 850 includes an available fields window 852 and a selected report fields window 854. Screen 850 allows the user to specify the records he/she wants to include in the summary report. Selected report fields window 854 may be populated with several fields. These fields may include a list of common default fields. The user may remove any fields that are not wanted or add other fields that are desired. After selecting the appropriate fields, the user may select "next" and the client 110 displays report summary screen 860, illustrated in FIG. 8F.

Screen 860 includes a name area 862 and text window 864. Name area 862 allows the user to enter a name for the report. The report name is used to identify the reports when "reports" is selected in navigator window 410. The report name may also be used on printed report headings. Text window 864 allows the user to review the report definition created via screens 810-850. The report definition allows the user to view the report type, report fields, conditions, sort fields, detail fields, etc. associated with the report.

Screen 860 also includes a return records area 866, a report security area 868, a print report definition button 870 and a test button 872. In the exemplary implementation, there are four "return records" options (all, distinct, top # and top %), as indicated at area 866. These options may be used to limit the amount of records that the report returns. For example, the "all" selection indicates that all records are returned and no restrictions are in place, "distinct" indicates that only those records that are distinct are returned, "top #" returns only the top X records, where the user enters the value X, and "top %" indicates that only the top Y percent of records are returned, where the user enters the value for Y. In the exemplary screen 860, the top 1000 records are selected. This means that up to 1000 records may be displayed in the report.

The user may also set the security level (Public or Private), as indicated at area 868. When private is selected, only designated parties, such as the creator of the report, may view the report. In addition, private reports are only displayed in the reports list of the navigator window 410 for the person who creates them. When public is selected, any party may run and view the custom report. The new custom report will also be displayed in the reports list of navigator window 410. The print report definition button 870 allows the user to print out the report definition illustrated in text window 864.

The test button 870 allows the user to test the report, as described in more detail below. By testing the report, the user may determine that changes need to be made to the report.

In summary, screen 860 gives the user a chance to quickly review the selections made, select criteria associated with returning records and set security options. This gives the user to ability to view fields associated with the custom report, go back to a previous screen(s) using the "prev" button, if necessary, and make changes to the custom report.

In the above example, the user created a custom report without using a pre-defined report as the starting point. In alternative implementations, the user could select an existing report (i.e., by clicking on the report name) and then choose the "new" command. The report designer then asks whether the user wishes to base the new report on the selected report. If the user enters "yes," the report designer is initialized with a copy of the selected report. The user can then modify the report by using one or more of screens 810-860 in a similar manner to that discussed above. The user may then save the new report at screen 860 using a different name than the existing report.

The user can further determine whether the report returns the desired information using a test command. For example, as described above, screen 860 includes test button 872. If the user wishes to check whether the report will return the desired results, the user may click the test button 872 (act 740). The server 140 receives the test request, executes the report and returns results of the custom report to client 110 (act 750). If the report does not return the desired results, the user may modify the report selections made on screen 860. The user may also modify his/her report by selecting "prev" on screen 860 and making the desired changes via screens 810-850. Permitting the user to view the report prior to exiting the report designer, saves the user time in determining whether the report produces the expected results.

In addition, screens 810-850 also include the "test" button. This allows the user to test the report at various stages of the process. Such an approach allows the user to dynamically check report results as the report is being defined, before going on and completing the report definitions.

Figure 9:
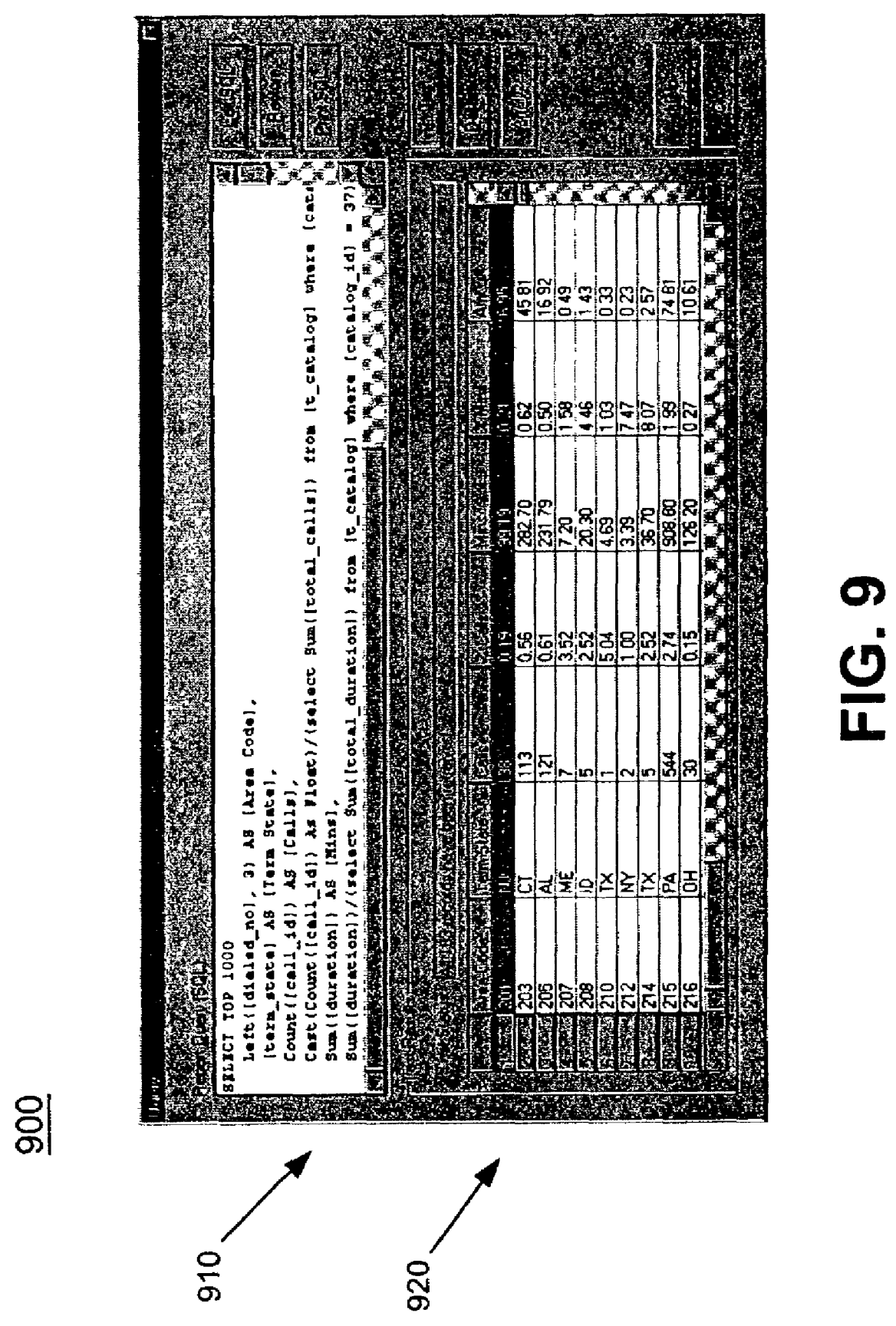

FIG. 9 illustrates an exemplary query screen 900 that may be downloaded to client 110 by server 140 at act 750. Screen 900 includes a report query window 910 and a test results window 920. The report query window 910 displays the query in the particular programming language used. In this example, the query is run using Microsoft SQL. The test results window 920 displays the results of the test in grid view. The test status in window 920 indicates that all 193 records have been retrieved. If the user does not like the test results (i.e., the report does not show what the user would like to see or if the report has some type of error), the user can go back to any one of screens 810-860, as discussed above, and change the report definition. In this manner, the user can view the report results without having to save the test, exit the report designer, run the test and then view the results. Rather, the user can view the test results and make changes without having to restart the report designer.

In an exemplary implementation consistent with the present invention, the user can also change labels associated with the fields to make the report easier to understand. For example, when numerical data is used to represent specific parties, divisions, companies, etc., it is often difficult to interpret the data because the user is unable to remember what the numbers represent. Screen 820 allows the user to provide alphanumeric translations for any of the fields that will be displayed on the report. The user may select an alphanumeric translation utility using a tool bar associated with screen 820 (not shown). The tool bar may be similar to menu/tool bar 430 (FIG. 4). When the user selects the alphanumeric translation utility, the server 140 provides a list of the fields that are available for translation and their corresponding values.

For example, assume that a particular field for a report displays calls made using various calling cards. Each calling card may be represented, for example, by a nine digit number. The user reviewing the report will typically be unable to remember the corresponding parties associated with the particular calling card numbers. Therefore, the user may use the alphanumeric translation utility to translate the nine digit numbers to names associated with the holders of the calling cards.

FIG. 10 illustrates an exemplary alphanumeric translation utility screen 1000 consistent with the present invention. Screen 1000 includes windows 1010 and 1020. Window 1010 lists all fields that are available for translation and window 1020 displays those fields for which translations have been made. In the exemplary window 1020, four values associated with four calling cards have been translated to the corresponding person associated with the calling card.

The user may select any of the fields displayed in window 1010 and provide alphanumeric translations. For example, the user may select "Term_Ctry_Code" and provide an alphanumeric translation that displays the name of the country, instead of a numeric code. As another example, the user may set up an alphanumeric translation for calls that terminate in particular area codes, to indicate a project name associated with a particular company project. The user may also set up an alphanumeric translation for a group of elements. For example, the user may set up an alphanumeric translation that defines a group of calling cards as "engineering," to indicate that these cards are held by personnel in the engineering department.

After making the desired alphanumeric translations, the user transmits the translations to the server 140. In the example illustrated in FIG. 10, when server 140 generates the report, the displayed report will includes the names of the card holders, as opposed to the numeric values. In this manner, the report designer provides a user-friendly output that is more easily understood by the users.

Processing for Creating and Running Batch Reports

Figure 11:
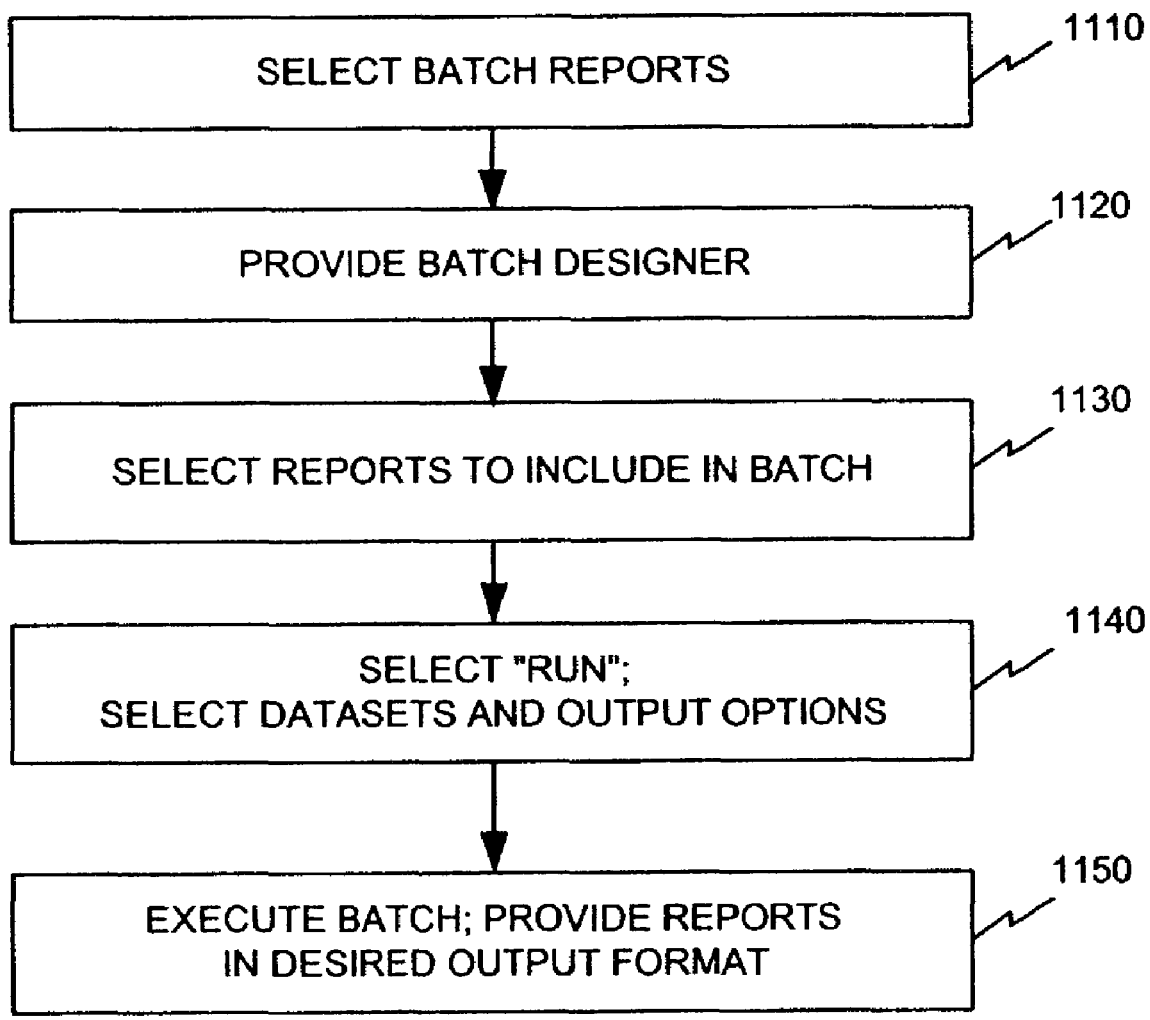
FIG. 11 is an exemplary flow diagram, consistent with the present invention, illustrating processing for creating and running batch reports.

The report program, consistent with the present invention, also permits a user to define groups of reports (i.e., a batch) to be run at any time, without having to select individual reports each time. FIG. 11 illustrates exemplary processing for creating and running batch reports.

Processing may begin with a user selecting the batch reports title bar on navigator window 410 (FIG. 4) and selecting "new" using the menu/tool bar 430 (act 1110). The client 110 may then prompt the user to provide a unique name for the batch. The server 140 may then download or the client 110 may then provide a batch designer screen, such as screen 1200 illustrated in FIG. 12 (act 1120). Batch designer screen 1200 includes windows 1210 and 1220, a number of function icons at area 1230 and a security selection area 1240.

Batches, consistent with the present invention, may contain reports for a number of different products. For example, a batch may include reports for the Vnet product and the toll free product. The user can then select the particular reports he/she wants to include in the batch via window 1210 (act 1130).

Figure 12:
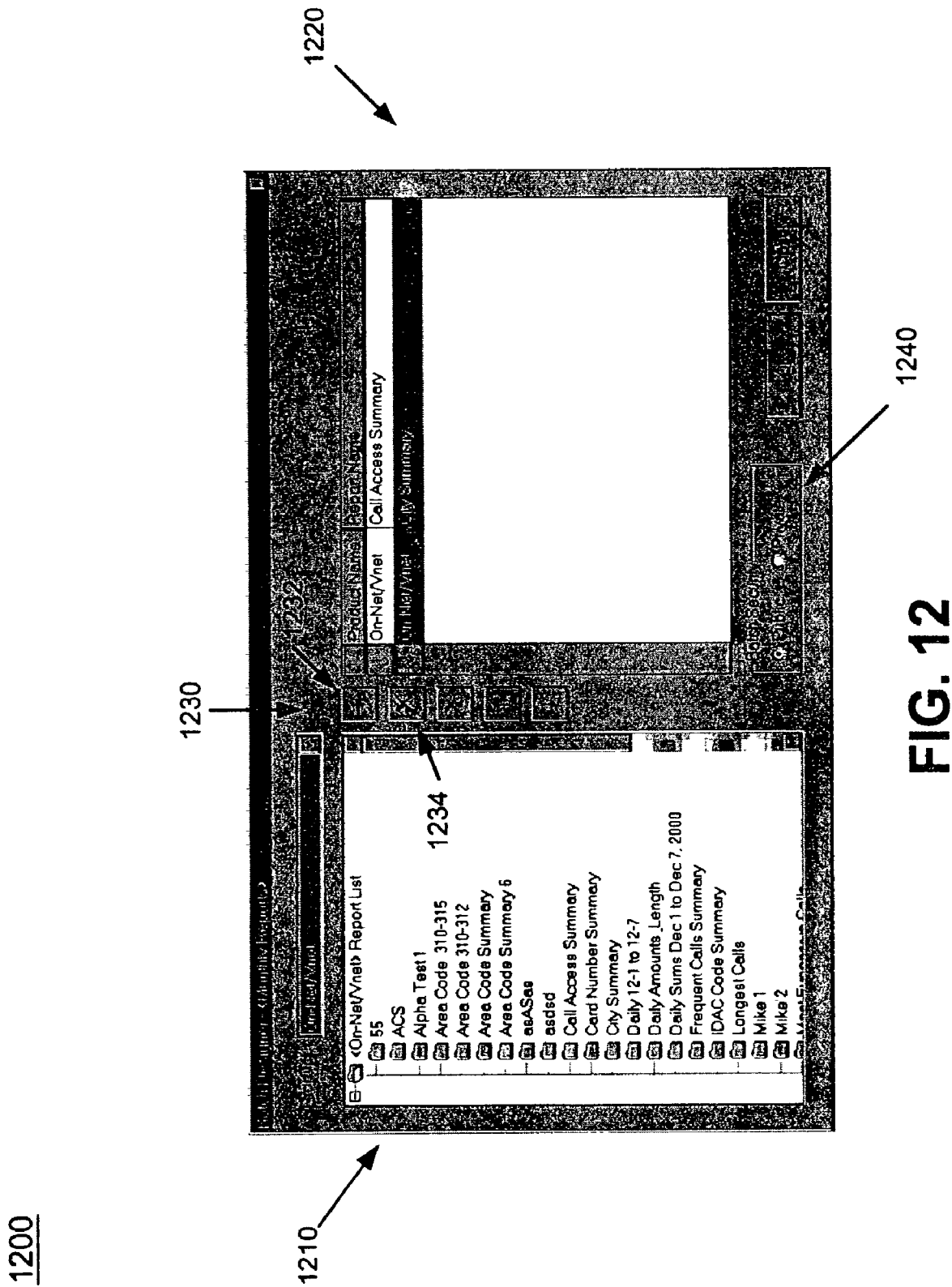
FIG. 12 illustrates an exemplary batch designer screen consistent with the present invention.

For example, referring to FIG. 12, the user may add a report to a batch by selecting it in window 1210 and clicking the plus icon 1232 at area 1230 or by double-clicking the report name. The report then is displayed in window 1220. To remove a report from a batch, the user may select the particular report in window 1220 and click the delete icon 1234. The user may click "OK" to save the batch. The user can also set the batch security to either public or private at area 1240. Each report in the batch may use a different dataset and output option when the batch is run, as described in more detail below.

Figure 13:
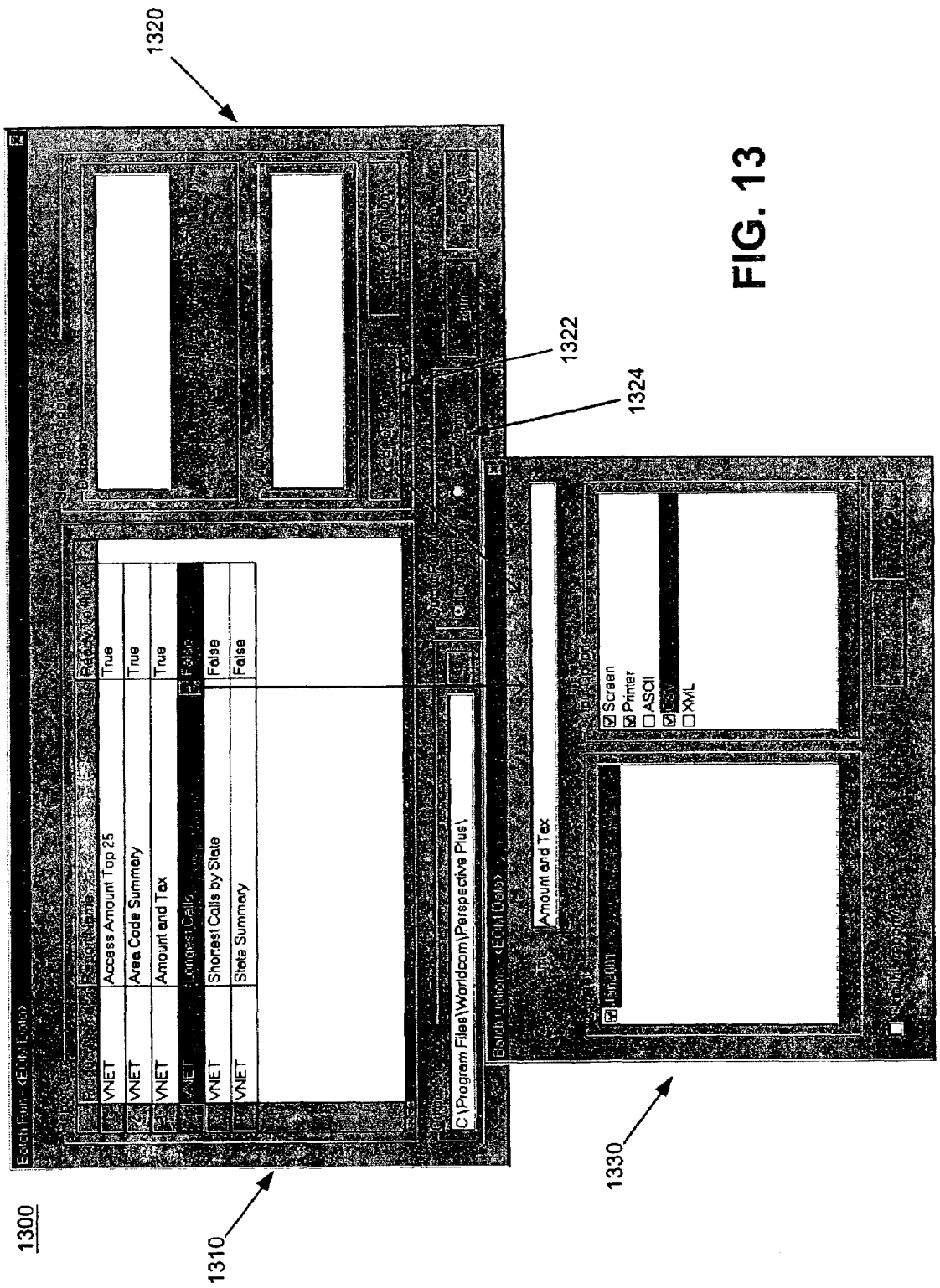
FIG. 13 illustrates an exemplary batch run screen consistent with the present invention.

After saving the batch, assume that the user wishes to run the batch. The user selects the particular batch in the batch reports list in navigator window 410 (FIG. 4). The batch will be identified by the name that user assigned to the batch. The user may then select a "run" icon in menu/tool bar 430 or select "run" under the File menu (act 1140). In either case, the server 140 may download or client 110 may provide a batch run screen, such as screen 1300 illustrated in FIG. 13. Screen 1300 includes a report list window 1310 and a selected report options window 1320. Window 1310 displays all the reports in the batch, including the product name, report name and ready to run status for each report. Window 1320 displays the datasets for the highlighted report in window 1310 and the output options for the report.

In an exemplary implementation, a report may not be run until the report options have been set for every report in the batch. To set or change the report options, the user highlights a report in window 1310 and selects "edit options" button 1322 in window 1320. The server 140 or client 110 then provides a batch options window, such as window 1330 in FIG. 13.

The user can then select the dataset(s) with which the particular report will be run and the output options (act 1140). The output options allow the user to display the reports on client 110, send the report to the printer, save the report in ASCII format, save the report in comma separated value (CSV) format or save the report in extended hypertext markup language (XML). Saving the report in any of these formats allows the user to open the saved file and import part or all of the report into other applications, such as a spreadsheet application. The user may also select to skip a report, which leaves the report in the batch but does not run the report.

After selecting the appropriate dataset(s) and output options, the ready to run column in window 1310 displays "true." If the ready to run column displays "false," the dataset(s) or output options have not been set. If the ready to run column displays "skip," that report will remain in the batch, but will not be run.

After the datasets and report options have been set, the user selects "OK" or "run" to run the batch. The server 140 executes the batch and provides a batch status window, such as window 1400 illustrated in FIG. 14 (act 1150). Window 1400 allows the user to track the progress of each report. For example, each report in the batch is listed in window 1400. The status illustrated on exemplary screen 1400 displays "run complete" for each of the reports. The status may also include "started," "executed," and "error," based on the particular status of the corresponding report. The user may receive the corresponding reports listed in window 1400 by selecting a particular report and clicking on the "process report results now" button 1410. The server 140 may then download the appropriate report in the selected output format (act 1150).

The report program, consistent with the present invention, also allows the user to run deferred batches using the defer output button 1324 in window 1320. If the deferred output option is selected, the server 140 may run the batch, but will not immediately output the report to the client 110. The user may exit client 110 after running a deferred batch and retrieve the reports at a later time.

Figures 14, 15:
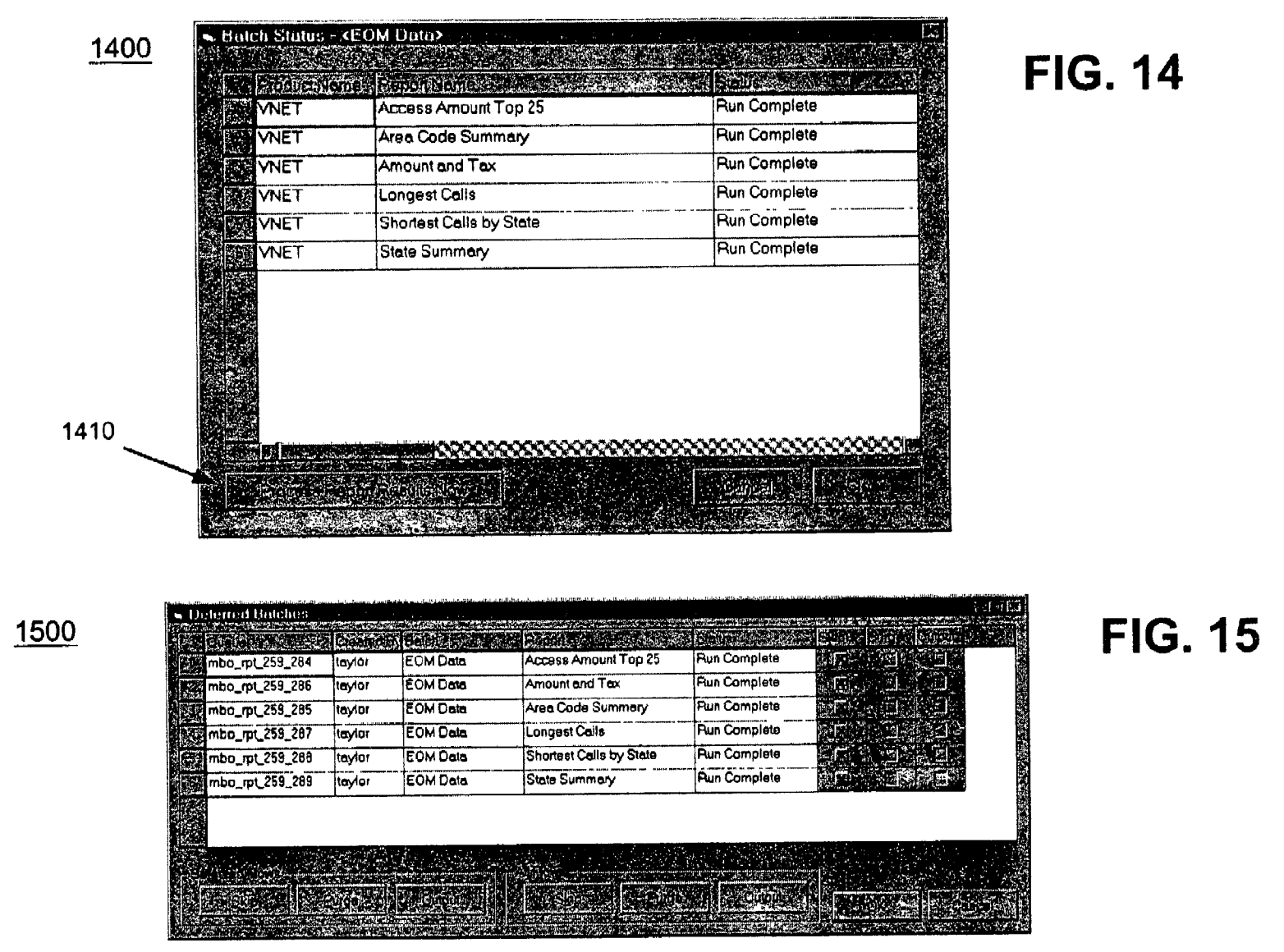

In an exemplary implementation, the server 140 may provide a deferred batches window to client 110, such as deferred batches screen 1500 in FIG. 15. Screen 1500 lists all the reports waiting for the user and allows the user to deliver, purge or skip one or more of the reports. In an exemplary implementation, screen 1500 is automatically displayed if deferred reports are waiting for the user upon logging onto server 140. Alternatively, the user may select a "deferred reports" command to receive window 1500.

In the exemplary screen 1500, the user may output, purge or skip a report. If output is selected, the report is delivered to the selected output medium (screen, printer, etc.). If purge is selected, the report is not delivered and is removed from the deferred batch. If skip is selected, the report is not delivered, but is left in the deferred batch. The purge option allows the user to close the deferred batches window 1500 and leave the report in the deferred batch until a later time.

In other implementations consistent with the present invention, the user may select a scheduled output option. In this implementation, the user may select a report or batch of reports and schedule a time in which each particular report will be run. For example, the user may set a report or batch of reports to be run on the first day of each month. The server 140 receives the schedule information and executes the report at the designated time. The server 140 may automatically download the report after running the report. Alternatively, the server 140 may make the report available via a scheduled report screen, similar to deferred batches screen 1500.

Described have been systems and methods for generating reports. An advantage of the invention is that a user, interacting with server 140 via a user-friendly interface, may make requests for pre-defined or customized reports. Another advantage of the invention is that the user may also test the report at various stages to determine whether the report will provide the desired information.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

For example, the systems and methods of the present invention are described in relation to generating reports associated with a customer's telecommunications usage. In alternative implementations consistent with the present invention, the systems and methods described above may be used to generate reports associated with other types of data. Further, the systems and methods have been described above with respect to a client/server environment. In other implementations of the present invention, the report generation system may operate as a stand-alone system. That is, a user may interface with the report generation program directly and not via a client device.

In addition, the present invention may be used in connection with any set of data. For example, suppose a user receives telecommunications services from a number of different sources, such as long distance service from one provider, toll free services from another provider, etc. The report tool can be used to provide reports for both of these services/products by simply mapping the raw data from the various providers into a common data structure. The report tool can then be used to generate reports for data from different service providers.

Lastly, aspects of the present invention have been described as series of acts in relation to FIGS. 3, 7 and 11. It should be understood that the order of these acts may vary in other implementations of the present invention. Moreover, non-dependent acts may be performed in parallel. Similarly, aspects of the present invention have been described with reference to a number of GUIs. It should be understood that these GUIs are exemplary only.

No element, act or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. In a system comprising at least one server, a method for generating a report regarding a user's telecommunications usage, comprising:

providing a user interface for a client device associated with the user, the user interface allowing the user to generate a report request associated with the user's telecommunications usage, the user interface including a test button to allow the user to test the report prior to finalizing the report;

receiving, from the user, information identifying a plurality of fields associated with at least one telecommunications product, at least one set of data upon which the report will be based, and a test command via selection of the test button;

receiving, at the server, the information identifying the plurality of fields, the at least one set of data and the test command;
generating the report based on the received information;
downloading the report to the client device; and
receiving, from the user, input associated with at least one of modifying one of the plurality of fields, adding or deleting one of the plurality of fields, or modifying a condition associated with one of the plurality of fields.

2. The method of claim 1, further comprising:
receiving, from the user, a second test command via selection of the test button;
generating a second report;
downloading the second report to the client device; and
receiving a save command from the user, the save command instructing the server to save input from the user associated with the second report.

3. The method of claim 1, wherein the report includes a plurality of data items, each data item representing summary information, the method further comprising:
receiving, from the user, input selecting a data item, wherein additional information associated with the data item is displayed to the user in response to the selecting.

4. The method of claim 1, wherein the server stores information identifying a plurality of reports, the method further comprising:
receiving, from the user, information identifying at least one report, at least one set of data, and a deferred output option;
executing the at least one report by the server; and
deferring output of the at least one report to the client device to a later time.

5. The method of claim 4, further comprising:
providing, by the server, an indication to the client device that a deferred report is available.

6. The method of claim 1, further comprising:
receiving, from the user, mathematical operators and Boolean operators associated with one or more of the plurality of fields.

7. The method of claim 1, wherein the user interface allows the user to input translations for at least one of the plurality of fields, the method further comprising:
receiving, from the user, a translation for a first one of the plurality of fields, the translation comprising a plurality of alphanumeric characters; and
inserting the translation in the report in place of the first field.

8. A computer-readable medium having stored thereon a plurality of sequences of instructions, said sequences of instructions including instructions which, when executed by a processor, cause the processor to:
provide a graphical user interface (GUI) to a client device, the GUI allowing a user to generate a request for a customized report associated with the user's telecommunications usage and to select at least one set of data upon which the customized report will be based;
generate the customized report based on information received via the GUI, the information identifying various fields and conditions associated with the customized report;
provide the customized report to the client device; and
provide an indication to the client device that a deferred report is available.

9. The computer-readable medium of claim 8, wherein the GUI includes a test input that allows the user to test the customized report at various stages, the instructions further causing the processor to:
generate the customized report in response to the test input received via the GUI; and
download the customized report to the client device via a network.

10. The computer-readable medium of claim 9, the instructions further causing the processor to:
receive at least one of modifications or additions to the customized report;
receive a second test input;
generate a second report based on the at least one of modifications or additions; and
download the second report to the client device.

11. The computer-readable medium of claim 8, the instructions further causing the processor to:
provide a summary data item in the customized report based on the received information, wherein when the summary data item is selected, detailed information associated with the summary data item is displayed.

12. The computer-readable medium of claim 8, wherein the GUI allows the user to identify a plurality of reports and a deferred output option, the instructions further causing the processor to:
receive information identifying at least one report, at least one dataset and the deferred output option;
generate the at least one report; and
defer output of the at least one report to the client device to a later time.

13. The computer-readable medium of claim 8, wherein the GUI allows the user to input at least one of mathematical operators or Boolean operators associated with one or more fields, the instructions further causing the processor to:
generate the customized report using received information that includes at least one of mathematical or Boolean operators.

14. The computer-readable medium of claim 8, wherein the GUI allows the user to provide alphanumeric translations for a plurality of fields, the instructions further causing the processor to:
receive an alphanumeric translation for a first one of the plurality of fields; and
insert the alphanumeric translation in the customized report in place of the first field.

15. A system for generating reports, comprising:
a memory configured to store data associated with a customer's telecommunications usage; and
a processor configured to:
provide a graphical user interface (GUI) allowing the customer to generate a request for a customized report and to select data upon which the customized report will be based,
receive information identifying various fields and conditions associated with the customized report and information identifying at least one set of data upon which the customized report will be based, the at least one set of data being stored in the memory,
generate the customized report based on the received information and the at least one set of data,
provide the customized report,
receive information identifying at least one report and a deferred output option,
execute the at least one report, and
defer output of the at least one report to the client device to a later time.

16. The system of claim 15, wherein the GUI includes a test input that allows the customer to test the customized report at various stages, wherein the processor is further configured to:

generate the customized report in response to the test input received via the GUI, and download the customized report to a client device via a network.

17. The system of claim 16, wherein the processor is further configured to:

receive at least one of modifications or additions to the customized report, receive a second test input, generate a second report based on the at least one of modifications or additions, and download the second report to the client device.

18. The system of claim 15, wherein the customized report includes a plurality of data items, wherein the processor is further configured to:

display at least one summary data item in the customized report, wherein the summary data item includes additional information that may be displayed when selected by the customer.

19. The system of claim 15, wherein the GUI allows the customer to identify a plurality of reports and to schedule execution for each of the respective plurality of reports, wherein the processor is further configured to:

receive information identifying a first report and schedule information indicating when the first report is to be executed, and execute the first report at a time indicated by the schedule information.

20. The system of claim 15, wherein the GUI allows the customer to input mathematical operators, Boolean operators and alphanumeric translations associated with the plurality of fields, wherein the processor is further configured to:

generate the customized report using received information that includes at least one of the mathematical or Boolean operators, and insert received alphanumeric translations in the customized report.

21. A computer-readable medium having stored thereon a plurality of sequences of instructions for telecommunications usage, said sequences of instructions including instructions which, when executed by a processor, cause the processor to:

provide a graphical user interface (GUI) allowing the user to:

generate a request for a report, the report including at least one of a pre-defined report and a customized report, identify data upon which the report will be based, test the report at various stages via selection of a test button, and identify a plurality of reports and at least one of a deferred output option or a scheduled execution option; and generate the report based on information received via the GUI.

22. The computer-readable medium of claim 21, wherein the GUI further allows the user to:

input at least one of mathematical operators or Boolean operators associated with one or more fields, and provide alphanumeric translations for a plurality of fields.

23. The computer-readable medium of claim 21, the instructions further causing the processor to:

generate the report in response to selection of the test button; and provide the report to a client device.

24. The computer-readable medium of claim 21, the instructions further causing the processor to:

provide the report to a client device, the report including at least one summary data item, wherein when the summary data item is selected, detailed information associated with the summary data item is displayed.

25. The computer-readable medium of claim 21, the instructions further causing the processor to:

receive information identifying at least one report, at least one dataset and the deferred output option;

execute the at least one report; and defer output of the at least one report.

26. The computer-readable medium of claim 25, the instructions further causing the processor to:

receive information identifying a first report and schedule information indicating when the first report is to be executed; and execute the first report at a time indicated by the schedule information.

* * * * *